United States Patent
Granqvist et al.

(10) Patent No.: US 7,731,915 B2
(45) Date of Patent: Jun. 8, 2010

(54) POLLUTANT DECOMPOSITION DEVICE

(75) Inventors: Claes-Göran Granqvist, Uppsala (SE); Sten-Eric Lindqvist, Uppsala (SE)

(73) Assignee: ChromoGenics AB, Uppsala (SE)

( * ) Notice: Subject to any disclaimer, the term of this patent is extended or adjusted under 35 U.S.C. 154(b) by 1395 days.

(21) Appl. No.: 10/508,258

(22) PCT Filed: Mar. 20, 2003

(86) PCT No.: PCT/SE03/00472

§ 371 (c)(1),
(2), (4) Date: Jun. 13, 2005

(87) PCT Pub. No.: WO03/078778

PCT Pub. Date: Sep. 25, 2003

(65) Prior Publication Data

US 2005/0238550 A1    Oct. 27, 2005

(30) Foreign Application Priority Data

Mar. 20, 2002   (SE) ................................. 0200878

(51) Int. Cl.
*B01J 19/08* (2006.01)
(52) U.S. Cl. .................... 422/186.3; 502/224; 502/226; 502/227; 428/212; 428/426; 428/428; 501/70; 501/64
(58) Field of Classification Search ............. 422/186.3; 502/224, 226, 227; 428/212, 426, 428; 501/70, 501/64
See application file for complete search history.

(56) References Cited

U.S. PATENT DOCUMENTS

| | | | | |
|---|---|---|---|---|
| 3,812,342 A | * | 5/1974 | McNamara, Jr. ............. 362/375 |
| 4,889,754 A | * | 12/1989 | Vargas ........................ 428/41.4 |
| 5,214,008 A | * | 5/1993 | Beckwith et al. .............. 501/69 |
| 5,595,813 A | * | 1/1997 | Ogawa et al. ................ 428/212 |
| 5,873,203 A | | 2/1999 | Thiel |
| 6,074,981 A | * | 6/2000 | Tada et al. ................... 502/224 |
| 6,261,652 B1 | * | 7/2001 | Poix et al. ...................... 428/34 |
| 6,468,428 B1 | * | 10/2002 | Nishii et al. ............. 210/497.3 |

FOREIGN PATENT DOCUMENTS

| | | |
|---|---|---|
| EP | 0 590 477 | 4/1994 |
| EP | 0 737 513 | 10/1996 |
| EP | 0 870 530 | 10/1998 |
| GB | 2 315 487 | 2/1998 |

OTHER PUBLICATIONS

Database WPI, Week 199841, Derwent Publications Ltd., London, GB; & JP 10 202110 A (TAO KK), Aug. 4, 1998.
Database WPI, Week 199829, Derwent Publications Ltd., GB; & JP 10 118522 A (EBARA CORP), May 12, 1998.

* cited by examiner

*Primary Examiner*—Alexa D Neckel
*Assistant Examiner*—Xiuyu Tai
(74) *Attorney, Agent, or Firm*—Young & Thompson

(57) ABSTRACT

Pollutant decomposition device, including at least one outer transparent sheet and at least one inner transparent sheet being arranged such that a gap is formed between them and such that the gap is in communication with a surrounding gaseous composition on one side of the device such that the gaseous composition can pass through the gap. The device further including a photocatalyst arranged in the gap for depolluting the gaseous composition that pass through the gap. To obtain optimum decomposition efficiency the outer transparent sheet has a high degree of ultraviolet transmittance compared with the inner transparent sheet.

7 Claims, 5 Drawing Sheets

POLLUTANT DECOMPOSITION DEVICE

THE FIELD OF THE INVENTION

The present invention relates to a pollutant decomposition device, capable of decomposing pollutants by photocatalytic reactions.

BACKGROUND OF THE INVENTION

Pollution of air inside buildings or other confined spaces often leads to discomfort for the occupants of the building, and in some cases it may even be a health hazard. Examples of pollutants that often are present in indoor environments are gaseous odors, microorganisms and smoke from tobacco.

Conventional treatment of polluted indoor air is focused on removal of solid particles by filtration, adsorption or electrostatic techniques. However, such removal only transfers the pollutants from one space to another, and eventually the cleaning surface or the like is saturated, whereby the cleaning efficiency is lowered. Furthermore, low molecular gaseous components are difficult to remove with such techniques.

Alternatively, polluted air can be cleaned by use of photocatalytic air-cleaners. Polluted air is then passed over a photocatalytic surface, which is irradiated with light. Pollutants that are adsorbed on the photocatalytic surface are then decomposed into harmless, odorless, and less toxic compounds. The process of photocatalysis is well known in the art, and no detailed description is given herein. One well-known photocatalyst is titanium dioxide ($TiO_2$), and other known photocatalysts are ZnO, CdS, $WO_3$, $SnO_2$, $ZrO_2$, $Sb_2O_4$, $CeO_2$ and $Fe_2O_3$. In general, the resulting photocatalytic activity of these materials is higher when the irradiated light is of high energy (short wavelength), such as light in the ultraviolet spectrum. WO 96/37291, U.S. Pat. Nos. 5,045,288 and 4,892,712 all show air cleaners utilizing photocatalysts.

Solar irradiation contains ultraviolet radiation, whereby it may be used as irradiation source in a photocatalytic air cleaning system or pollutant decomposition device. EP 0590 477A1 discloses an example of an air cleaning system in the form of a window of double pane type, wherein the air is passed in-between the two window panes and wherein a photocatalyst is arranged in the intermediate space or on one or both of the intermediate window surfaces. However, such existing systems suffer from a number of disadvantages, which significantly lower the cleaning efficiency of the window, which are overcome by the present invention.

SUMMARY OF THE INVENTION

The object of the invention is to provide a new pollutant decomposition device, which overcomes the drawbacks of the prior art. This is achieved by the device as defined in claim 1.

One advantage with the pollutant decomposition device according to the invention is that the cleaning-capacity of the device is significantly increased, while preserving over all optical properties.

Another advantage is that photocatalysts that require irradiation in the ultraviolet spectrum to be activated can be used in pollutant decomposition devices of this type.

Embodiments of the invention are defined in the dependent claims.

BRIEF DESCRIPTION OF THE DRAWINGS

The invention will be described in detail below with reference to the drawings, in which.

DETAILED DESCRIPTION OF PREFERRED EMBODIMENTS

The pollutant decomposition device according to the present invention generally relates to a solar radiation activated photocatalytic pollutant decomposition device, i.e. the irradiation that give rise to the photocatalytic activity is mainly provided by the sun. However, during night time or at locations where sunlight is not present at sufficient amounts, the pollutant decomposition device may be irradiated with light comprising light in the ultraviolet spectrum from another source of light. Furthermore, the pollutant decomposition device according to the present invention comprises at least one sheet that serves to fully or partly enclose the air or gaseous composition that is to be depolluted, and at least one sheet that is provided with a photocatalyst. The pollutant decomposition device may e.g. be an air cleaning window of the type presented in EP 0590 477 wherein the outer sheet is represented by the outer window pane, which together with the walls etc. of the building encloses air to be depolluted.

Figure 1:
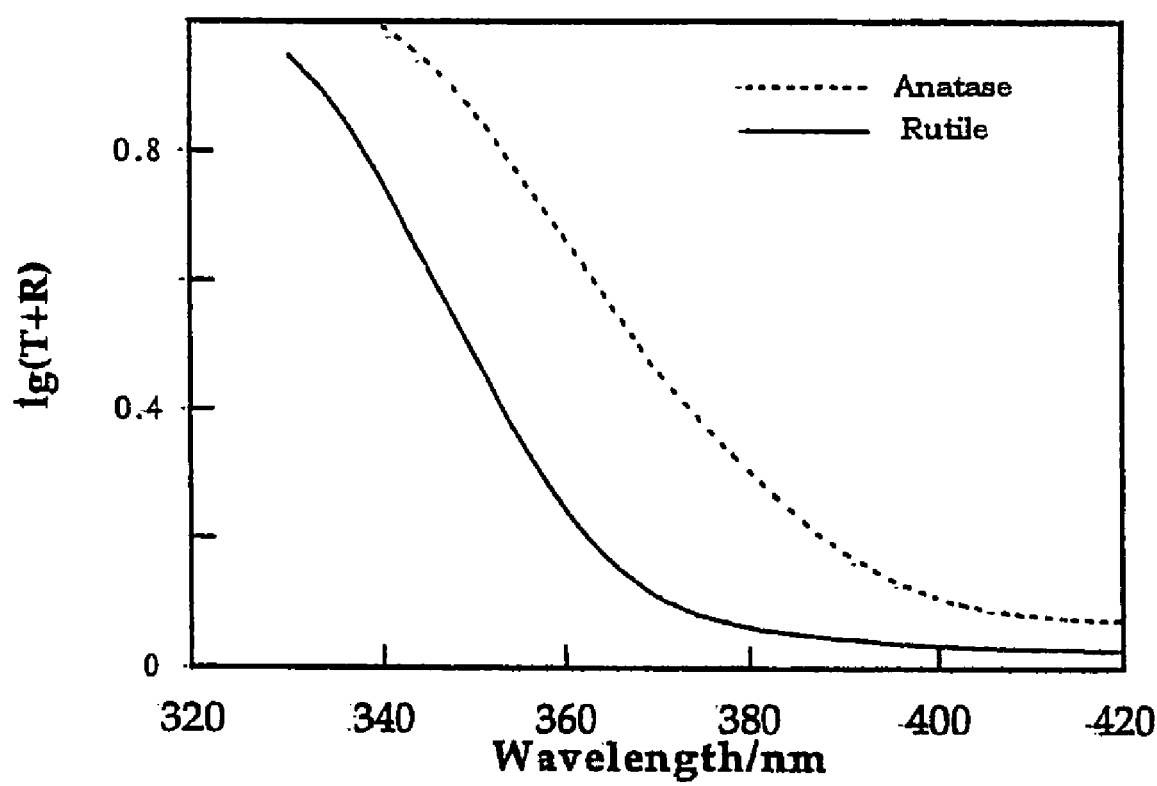
FIG. 1 shows examples of absorption spectra for photocatalytic $TiO_2$ of two different structures, anatase and rutile.

As mentioned above, maximum photocatalytic activity of the preferred photocatalysts is generally obtained when the photocatalyst is irradiated with light in the ultraviolet spectrum, i.e. light of wavelengths less than approximately 380 nm. FIG. 1 shows examples of absorption spectra for photocatalytic $TiO_2$ of two different structures, anatase and rutile. As can be seen in FIG. 1, the lower absorption limit is about 370 nm for anatase and 400 nm for rutile. Therefore, it is of great importance that the solar irradiation that reaches the photocatalytic surface in a pollutant decomposition device comprises as much ultraviolet irradiation as possible, to achieve optimum efficiency for the decomposition process. As will be discussed in detail below, this may be achieved by selecting a material with low ultraviolet absorption for the outer layer in the pollutant decomposition device. However, in many applications, it is highly undesirable that such ultraviolet irradiation is permitted to pass through the device (in large amounts). Especially when the transmitted light enters the interior of a building, as it then would induce degradation of organic materials, bleach textiles etc. Therefore the inner transparent sheet should have a normal or high degree of ultraviolet absorption.

Figures 2A, 2B:
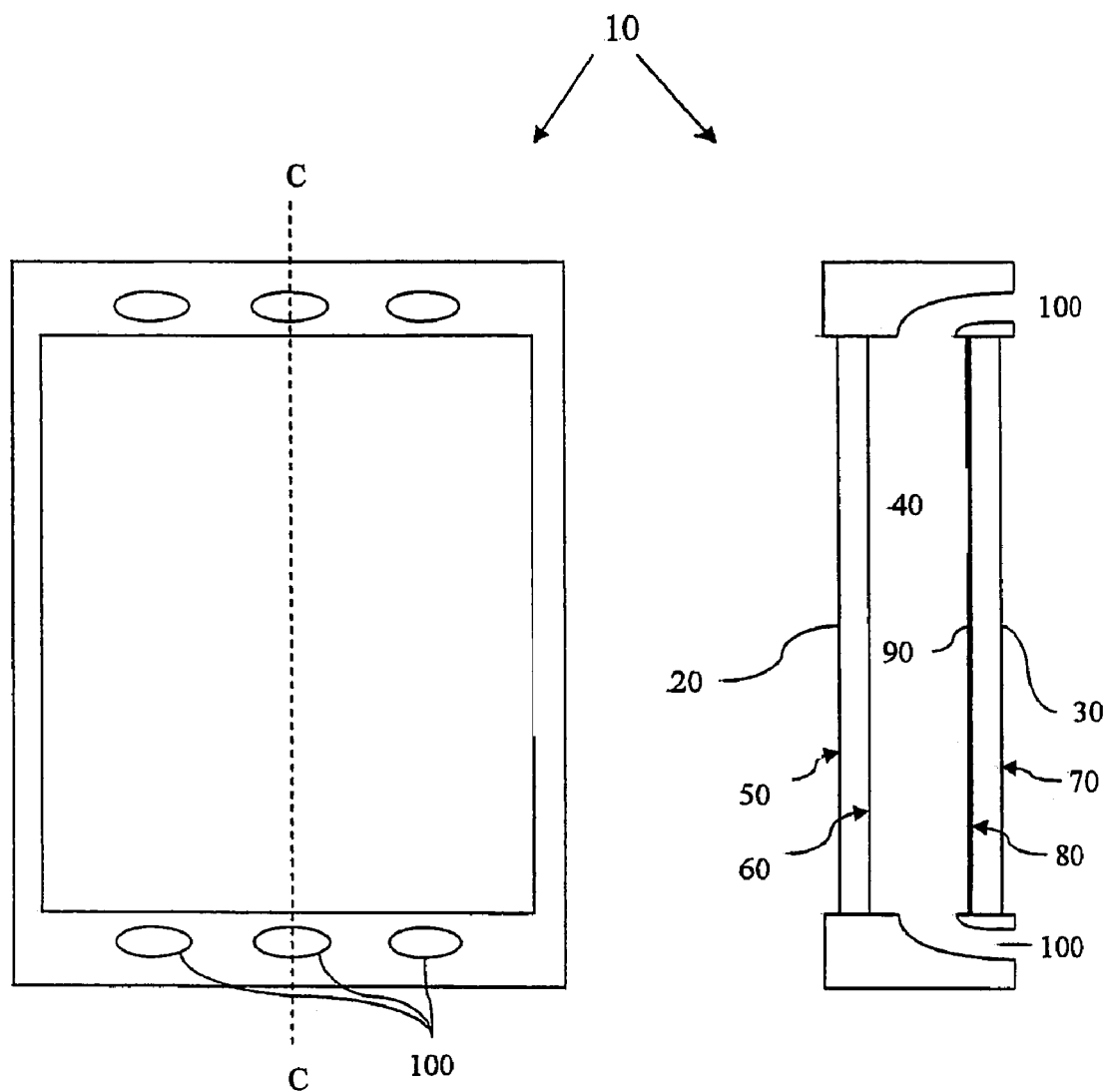
FIGS. 2a and 2b show one embodiment of a pollutant decomposition device according to the present invention.

According to one embodiment of the pollutant decomposition device according to the present invention it is provided in the form of an air cleaning window (FIG. 2). Below, the air cleaning window according to this embodiment is described as a window in a building, but it should be understood that the air cleaning window according to the invention may be used in any window application, such as in automobiles, airplanes, boats and the like.

FIG. 2 shows one embodiment of an air cleaning window 10 according to the present invention. An outer transparent sheet 20 and an inner transparent sheet 30 are arranged in a double glazing structure, such that an air gap 40 is formed between them. The outer transparent sheet 20 has a non air gap surface 50 facing a source of irradiation, and an air gap surface 60 facing the air gap 40. Consequently, the inner transparent sheet 30 has a non air gap surface 70 facing away from the source of irradiation, and an air gap surface 80 facing the air gap 40. A photocatalyst 90, which is activated by ultraviolet irradiation, is arranged in the air gap 40 to perform the air cleaning. To achieve circulation of air through the air gap 40, air conduits or holes 100 are arranged at the top and the bottom of the window 10, respectively.

Figure 3:
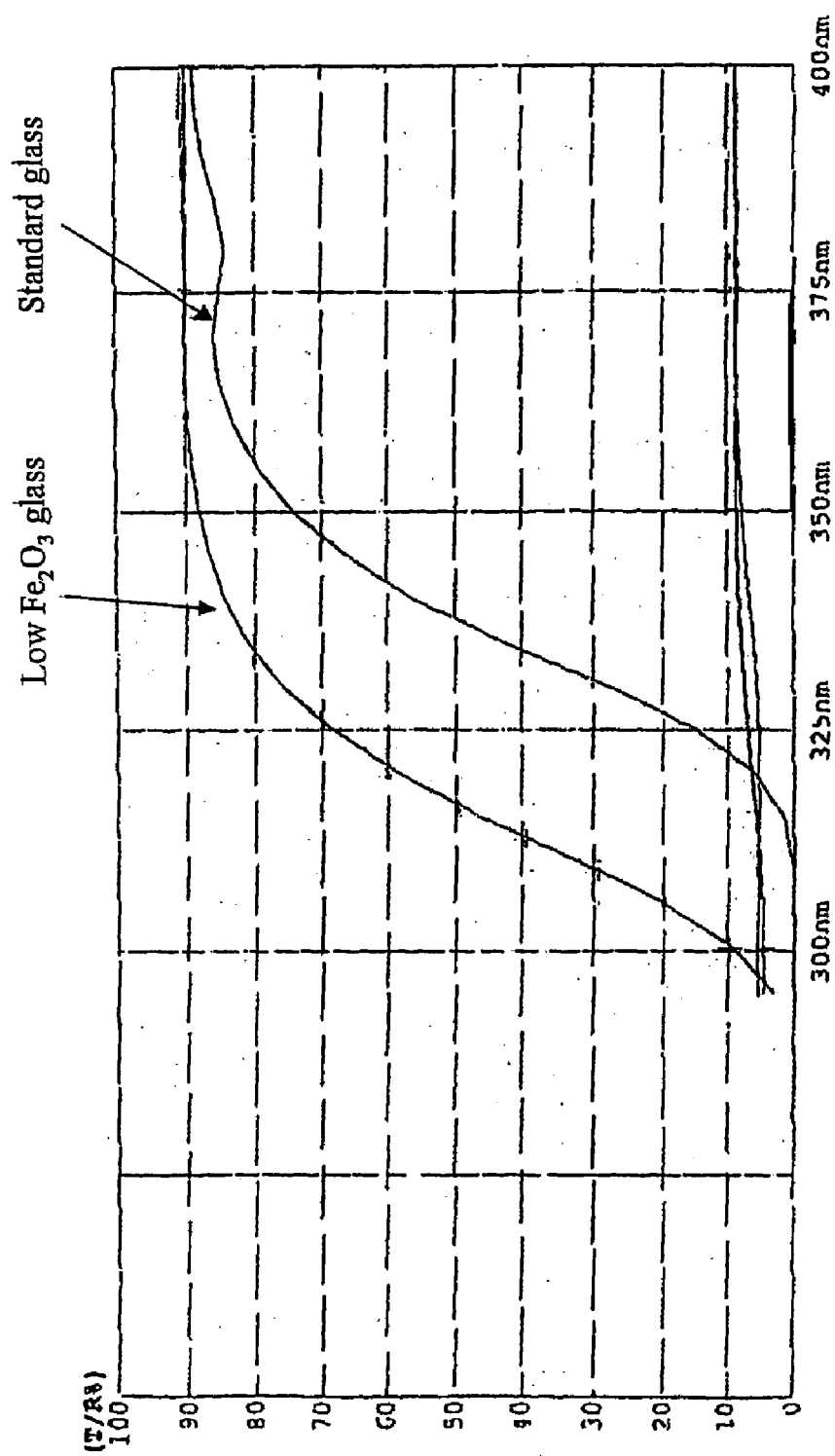
FIG. 3 shows the ultraviolet transmittance for a standard glass and a low $Fe_2O_3$ glass.
Figure 4:
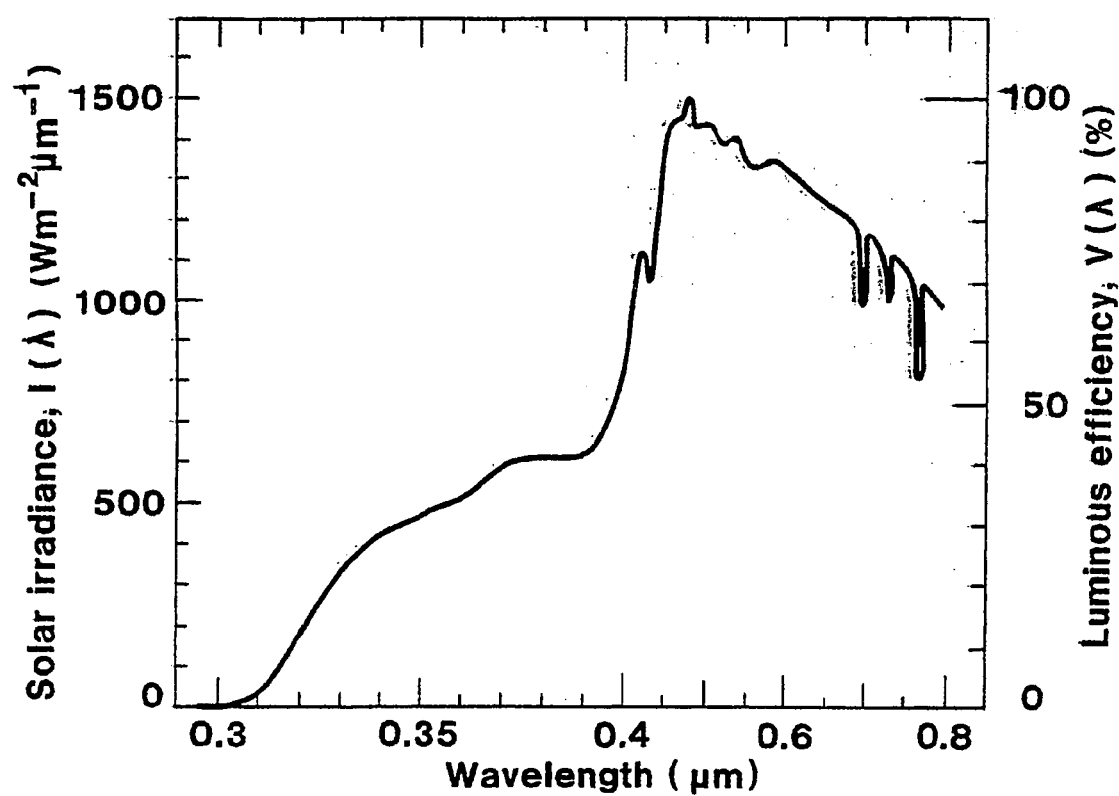
FIG. 4 shows an example of the spectral solar irradiance at ground level.

As mentioned above, the outer transparent sheet 20 must show a high degree of ultraviolet transmittance to achieve optimum cleaning efficiency. Therefore, the outer transparent sheet 20 is preferably made of glass with a low $Fe_2O_3$ content, as the transmittance of ultraviolet light is highly dependent on the $Fe_2O_3$ content. FIG. 3 shows a comparison between a standard glass with a normal $Fe_2O_3$ content and a low $Fe_2O_3$ glass. The difference in transmittance in the ultraviolet spectra may not seem very large, but experiments have shown dramatic increases in reaction rates at the photocatalyst 90. The increased reaction rates are clear when FIG. 3 is compared with the absorption spectra in FIG. 1. FIG. 1 shows that the photocatalytic activity of TiO2 increases significantly for wavelengths shorter than 350 nm, whereas FIG. 3 shows that the transmittance for standard glass drops significantly below 350 nm. Considering the solar spectrum shown in FIG. 4 it can be seen that the irradiation intensity from the sun drops at wavelengths shorter than 350 nm, further enhancing the positive effect of the low $Fe_2O_3$ glass. More in detail, FIG. 3 shows that the ratio that may be obtained between the ultraviolet transmittance of the low $Fe_2O_3$ glass and the standard glass is in the range of 10:8 to 10:1 or more depending on wavelength. One example of a commercially available low $Fe_2O_3$ glass is Optiwhite by Pilkington.

As further mentioned above, the inner transparent sheet 30 should preferably absorb a certain degree of ultraviolet irradiation. Therefore, the inner transparent sheet 30 is preferably made of a standard or a high $Fe_2O_3$ glass.

Preferably, the photocatalyst 90 is a thin, transparent film of $TiO_2$, but other suitable materials are listed above. In a preferred embodiment, the photocatalyst 90 is applied as a thin film on the air gap surface 80 of the inner transparent sheet 30, and one example of a commercially available glass of this type is Activ Glass by Pilkington.

To further enhance the cleaning process, the inner transparent sheet 30 may have a low emission coating on the non air gap surface 70, whereby the temperature of the inner transparent sheet 30 is raised accompanied by increased reaction rates at the photocatalyst 90 and increased flow rate through the gap 40.

The air conduits or holes 100 may be formed in any suitable way, as long as sufficient circulation is achieved trough the air gap. The conduits or holes 100 may further be arranged along the sides of the window or around the perimeter of the same. Furthermore, forced circulation may be applied by connecting a fan or the like to the air conduits or holes 100.

Throughout the selection of window materials to optimize the cleaning action of the window it is of great importance that the selections are made such that the visual impression of the resulting window is acceptable.

To achieve thermal insulation where needed, one or both of the outer and the inner transparent sheets 20, 30 could be replaced with an insulating double-glazed window pane. The present invention is especially suitable for buildings with large double-glazing areas.

Figures 5A, 5B:
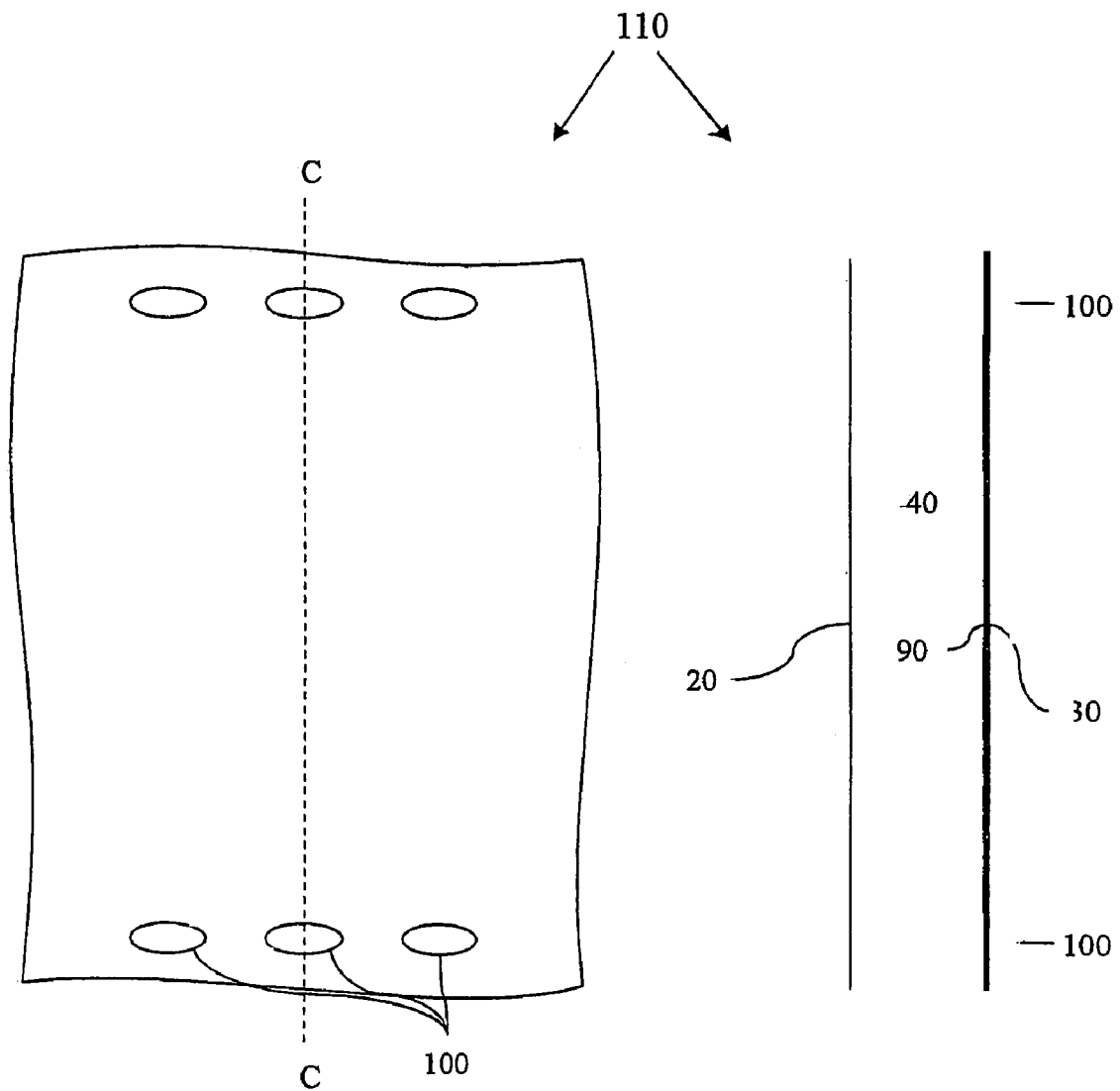
FIGS. 5a and 5b show a section of another embodiment of a pollutant decomposition device according to the present invention.

According to another embodiment of the pollutant decomposition device according to the present invention, at least one of the outer transparent sheet and the inner transparent sheet is made of a flexible plastic material, with a high degree of ultraviolet transmittance. FIGS. 5a and 5b schematically shows one embodiment of this type wherein the pollutant decomposition device 110 is comprised of two sheet of flexible plastic material 20 and 30 which are interconnected (not shown) so that a gap 40 is formed there between, and wherein air conduits in the form of perforations 100 are made in the inner transparent sheet 30 to create a flow of air in the gap 40. This embodiment may be used as a tarpaulin to provide an extremely versatile pollutant decomposition device. If designed so that the gap 40 between the sheets is self supported and thus preserved even when a slight pressure is applied on the layered structure, objects that are to be depoluted simply can be wrapped in the flexible pollutant decomposition device and hence be depolluted in an extremely effective manner. One possible way to make a self supported gap 40 is to design gap forming interconnecting structures of inflatable elements, flexible foamed polymer material or the like.

In another embodiment of the pollutant decomposition device according to the present invention, it is designed as a mobile depollution chamber, which may be used for depolluting polluted objects. Such mobile depollution chambers and tarpaulin type depollution devices are very useful, e.g. at accident cites, in situations of chemical warfare or the like where it is of great interest to depollute objects with short delay, and preferably at the cite as transportation of polluted objects may be hazardous. In one special embodiment the depollution chamber is used to house a mobile hospital, whereby the amount of hazardous germs, viruses in the air may be drastically lowered. Such depollution chambers may be designed as a two layer tent, wherein a separate inner transparent sheet of flexible plastic material and a separate outer transparent sheet of flexible plastic material forms the two layers of the tent, and wherein openings suitably are arranged in the inner transparent sheet to provide an airflow in the gap between the two sheets. Alternatively, such chambers may be formed using the interconnected tarpaulin type pollutant decomposition device of above. In one special embodiment, the inner transparent sheet of flexible plastic material is divided into a large number of separate sheets forming passages for the enclosed air there between.

An example of a flexible plastic material, with a high degree of ultraviolet transmittance is ethyl tetra fluoro ethylene. An example of a flexible plastic material, with a low degree of ultraviolet transmittance is polyester. The applicants have successfully deposited photocatalyst films on thin polyester substrates. To further enhance the stability of the polyester film, which may be degraded by uv-radiation, it may further be provided with an additional uv-absorbing film that is transparent to visible light.

The invention claimed is:

1. Pollutant decomposition device comprising at least one outer transparent sheet and at least one inner transparent sheet being arranged such that a gap is formed between them and such that the gap is in communication with a surrounding gaseous composition on one side of the device such that the gaseous composition can pass through the gap, the device further comprising a photocatalyst arranged in the gap on the surface of the inner transparent sheet, the photocatalyst being in contact with the gaseous composition within the gap at a same surface as being irradiated through said outer transparent sheet, the irradiated surface of the photocatalyst being in contact with the gaseous composition within the gap, wherein the outer transparent sheet has a high degree of ultraviolet transmittance compared with the inner transparent sheet, wherein the ratio between the ultraviolet transmittance of the outer transparent sheet and the inner transparent sheet is in the ranged of 10:8 to 10:1.

2. Pollutant decomposition device according to claim 1, wherein the inner transparent sheet has a low emission coating on the non air gap surface.

3. Pollutant decomposition device according to claim 1, wherein the outer transparent sheet is made of a flexible plastic material.

4. Pollutant decomposition device according to claim 3, wherein the inner transparent sheet is made of a flexible plastic material.

5. Pollutant decomposition device according to claim 4, wherein the two sheets are interconnected so that a gap is formed there between, and wherein air conduits in the form of perforations are made in the inner transparent sheet to create a flow of air in the gap.

6. Pollutant decomposition device according to claim 1, wherein the outer transparent sheet is made of low $Fe_2O_3$ glass.

7. Pollutant decomposition device according to claim 1, wherein the inner transparent sheet is made of a flexible plastic material.

\* \* \* \* \*